United States Patent
Abe

(10) Patent No.: US 6,687,591 B2
(45) Date of Patent: Feb. 3, 2004

(54) METHOD OF AND APPARATUS FOR CONTROLLING TORQUE-DOWN UPON GEAR CHANGING

(75) Inventor: Hiroshi Abe, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/996,607

(22) Filed: Nov. 30, 2001

(65) Prior Publication Data

US 2002/0086771 A1 Jul. 4, 2002

(30) Foreign Application Priority Data

Dec. 20, 2000 (JP) .......................... 2000-387848

(51) Int. Cl.[7] .................... G06F 17/00; B60K 41/04
(52) U.S. Cl. ...................... 701/54; 701/53; 701/86; 477/101; 477/102; 477/103; 123/339.11; 123/406.23; 123/406.26
(58) Field of Search .......................... 701/51, 53, 54, 701/86; 477/101, 102, 107, 109, 110, 121, 158, 159, 98, 106, 906; 123/339.11, 332–335, 406.23, 406.26, 406.11, 481, 198 F; 74/335, 337

(56) References Cited

U.S. PATENT DOCUMENTS

| | | | | |
|---|---|---|---|---|
| 4,890,515 A | * | 1/1990 | Taniguchi et al. | 477/151 |
| 5,417,625 A | * | 5/1995 | Yamaki et al. | 477/109 |
| 5,816,976 A | * | 10/1998 | Kuroiwa et al. | 477/102 |
| 5,884,605 A | * | 3/1999 | Nagaishi et al. | 123/339.11 |
| 6,254,508 B1 | * | 7/2001 | Kojima et al. | 477/109 |
| 6,406,403 B1 | * | 6/2002 | Steeby | 477/109 |

FOREIGN PATENT DOCUMENTS

JP 7-293682 11/1995

\* cited by examiner

*Primary Examiner*—Jacques H. Louis-Jacques
(74) *Attorney, Agent, or Firm*—Foley & Lardner

(57) ABSTRACT

Torque-down controlling conducted on an engine torque upon gear changing of an automatic transmission is implemented by converting a demand for a rate of torque-down against the engine torque into a down rate of combustion torque (an objective down rate). Further, from a difference between the present ignition timing of the engine and the MBT (Minimum Advance for Best Torque) ignition timing, the present down rate that is a rate of the present combustion torque against the combustion torque at the MBT ignition timing to subsequently multiplying the present down rate by the objective down rate so that a counter MBT down rate that is a down rate of the present combustion torque against the combustion torque at the MBT ignition timing is obtained. Thus, from the obtained counter MBT down rate, an amount of retard of ignition timing from the MBT ignition timing is calculated to implement the torque-down controlling.

6 Claims, 4 Drawing Sheets

METHOD OF AND APPARATUS FOR CONTROLLING TORQUE-DOWN UPON GEAR CHANGING

BACKGROUND OF THE INVENTION

1. Field of the Invention

The present invention relates to a method of and an apparatus for conducting a torque-down controlling of an internal combustion engine upon gear changing of an automatic transmission in a manner such that the present engine torque (an axial torque) is controlled at a predetermined demand for the rate of torque-down.

2. Background Information

As is known from Laid-open Japanese Patent Application No. 7-293682, the torque-down controlling is conducted upon gear changing by an engine control unit so that the ignition timing of an internal combustion engine is retarded in response to a demand for torque-down made by a transmission control unit.

SUMMARY OF THE INVENTION

Of recent years, in order to accomplish a further reduction in a mechanical shock upon gear changing, there has been a tendency that a delicate control is requested to be made for conducting the torque-down controlling of an internal combustion engine upon gear changing. Thus, it is necessary to conduct the torque-down controlling of the engine so that an engine toque at the present time is accurately controlled at a predetermined demand for the rate of torque-down. Nevertheless, a problem as described below occurs.

That is to say, even if a demand for the rate of torque-down against the present engine toque is determined, an angular amount that the ignition timing should be retarded cannot be definitely determined for the reason as set forth below. Namely, it is true that an engine torque can be obtained by removing a friction torque from a combustion torque of an engine. However, since the amount of friction torque changes depending on the rotating speed of the engine, an angular amount that the ignition timing should be retarded relative to a demand for the rate of torque-down must necessarily alter depending on the demand for the rate of torque-down and the engine rotating speed at that time and further the ignition timing adopted at that time. Accordingly, a lot of data must be stored, in order to accurately conduct the torque-down controlling.

A primary object of the present invention is therefore to provide a technical measure for achieving a delicate torque-down controlling according to less storage amount of data by way of such a discovery that the relationship between an amount of retard from the ignition timing for MBT and the rate of torque-down in the combustion torque can be definitely determined irrespective of the operating conditions of an internal combustion engine.

Another object of the present invention is to provide a method of controlling torque-down upon gear changing during the operation of an internal combustion, which can realize the above-mentioned primary object.

A further object of the present invention is to provide an apparatus for controlling torque-down upon gear changing during the operation of an internal combustion, which can realize the above-mentioned primary object.

In order to achieve the above objects, the present invention contrives such a technical constitution that when a torque-down controlling of an internal combustion engine is implemented at a predetermined demand for a rate of torque-down against the present torque exerted by the engine upon gear changing of an automatic transmission, the demand for the rate of the torque-down is initially converted into a rate of torque-down of a combustion torque (a desired torque-down rate), the rate of torque-down of the combustion torque is subsequently converted into a counter MBT torque-down rate that is a torque-down rate against a combustion torque at the MBT ignition timing, and further an amount of retard from the MBT ignition timing is calculated from the counter MBT torque-down rate for the purpose of achieving the torque-down controlling of the engine.

In accordance with one aspect of the present invention, there is provided a control apparatus provided to have a control communication with an internal combustion engine and an automatic transmission, and including a torque-down control unit for implementing a torque-down controlling of the internal combustion engine upon gear changing of the automatic transmission by cutting down a part of the present engine torque at a predetermined demand for torque-down rate, wherein the torque-down control unit:

converts the predetermined demand for torque-down rate into a down rate of combustion torque;

converts the down rate of combustion torque into a counter MBT down rate that is a down rate against a combustion torque at an ignition timing for a Minimum Advance for Best Torque (MBT ignition timing); and, calculates an amount of retard of ignition timing from the MBT ignition timing on the basis of the counter MBT down rate, for implementing the torque-down controlling of the engine.

In accordance with another aspect of the present invention, there is provided an apparatus for controlling a torque-down of the present engine torque of an internal combustion engine upon gear changing of an automatic transmission at a predetermined demand for a rate of torque-down, comprising:

a combustion torque down rate converting means for converting the predetermined demand for torque-down rate into a down rate of combustion torque;

a counter MBT down rate converting means for converting the down rate of combustion torque into a counter MBT down rate that is a down rate against a combustion torque at an ignition timing for a Minimum Advance for Best Torque (MBT ignition timing); and, an ignition timing retard amount calculating means for calculating an amount of retard of ignition timing from the MBT ignition timing on the basis of the counter MBT down rate, for implementing the torque-down controlling of the engine.

In accordance with a further aspect of the present invention, there is provided a method of controlling a torque-down of the present engine torque of an internal combustion engine upon gear changing of an automatic transmission at a predetermined demand for a rate of torque-down, comprising:

converting the predetermined demand for torque-down rate into a down rate of combustion torque;

converting the down rate of combustion torque into a counter MBT down rate that is a down rate against a combustion torque at an ignition timing for a Minimum Advance for Best Torque (MBT ignition timing); and, calculating an amount of retard of ignition timing from the MBT ignition timing on the basis of the counter MBT down rate, for implementing the torque-down controlling of the engine.

The above and other objects, features and advantages of this invention will become more apparent from the following description of preferred embodiments with reference of the accompanying drawings.

DETAILED DESCRIPTION OF THE PREFERRED EMBODIMENTS

Figure 1:
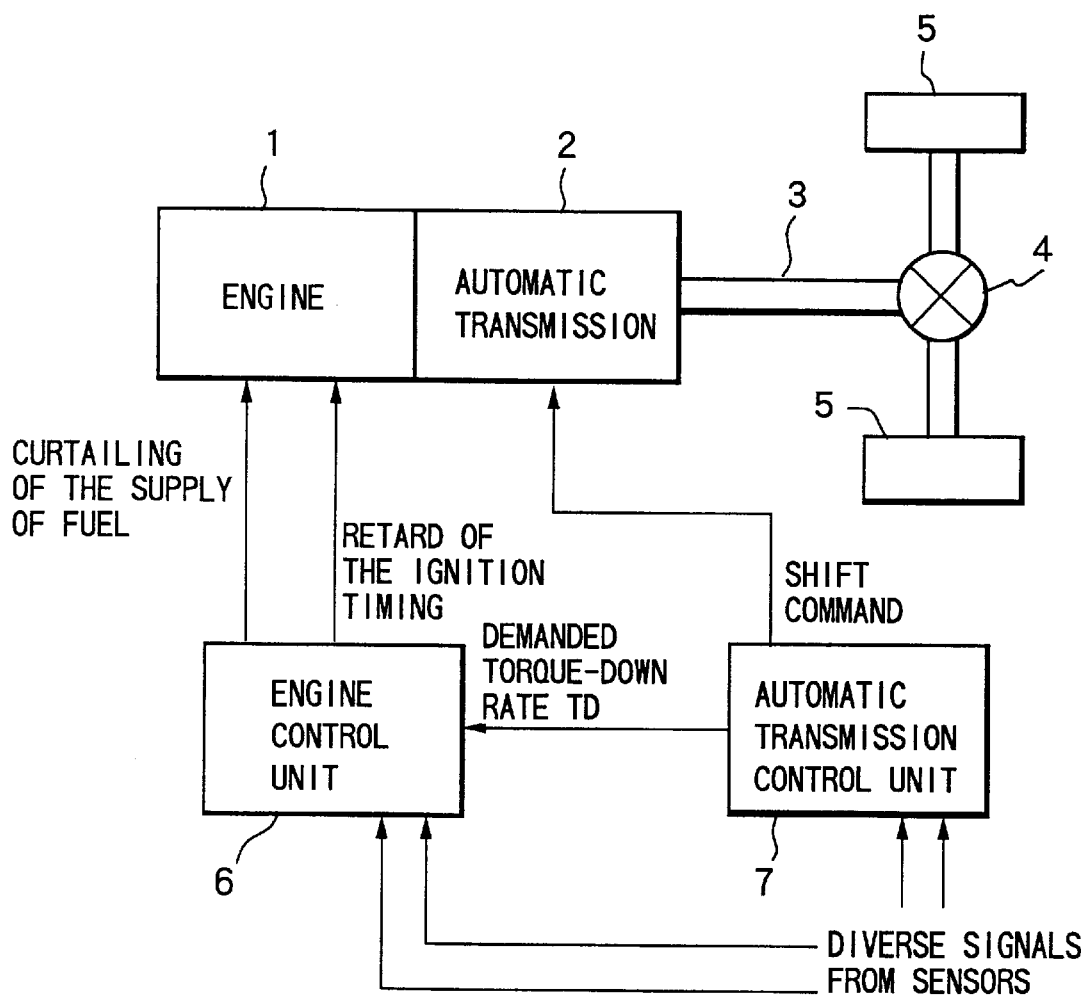
FIG. 1 is a schematic block diagram illustrating a vehicle-drive system according to an embodiment of the present invention.

Referring to FIG. 1, an internal combustion engine 1 has its output shaft (the crank shaft), which is connected to an automatic transmission 2. The automatic transmission 2 has its own output shaft 3 to exert a drive power for driving drive wheels 5, 5 via a final gear unit 4.

The operations of the engine 1 and the automatic transmission 2 are controlled by an engine control unit 6 and an automatic transmission control unit 7, respectively, on the basis of a variety of data indicating the operating conditions of the engine 1 and the automatic transmission 2 that are detected by respective sensors. The engine control unit 6 and the automatic transmission control unit 7 are electrically connected to one another by appropriate communication lines to be able to conduct a cooperative communication. Namely, the automatic transmission control unit 7 refers back to a shift-pattern diagram on the basis of detected data indicating e.g., a throttle valve opening degree TVO and a vehicle speed VSP in order to set an objective gear position, and when the objective gear position is changed from one to the other, a shift command signal is delivered from the control unit 7 to the automatic transmission 7 to complete the gear changing. However, when the gear changing takes place in the automatic transmission 7, a demand for torque-down (the demanded torque-down rate TD) is issued from the transmission control unit 7 to the engine control unit 6 to reduce shifting shock.

Upon receipt of the torque-down demand (the demanded torque-down rate TD), the engine control unit 6 implements the torque-down controlling upon gear changing, according to the demanded torque-down rate, so as to conduct the controlling of the ignition timing as well as the controlling of the fuel injection until the ignition timing is retarded and the curtailing of fuel supply to a part of engine cylinders is carried out. At this stage, an amount of retard of the ignition timing and the number of cylinders to which the supply of fuel is curtailed are determined depending on the demanded torque-down rate TD.

Figure 2:
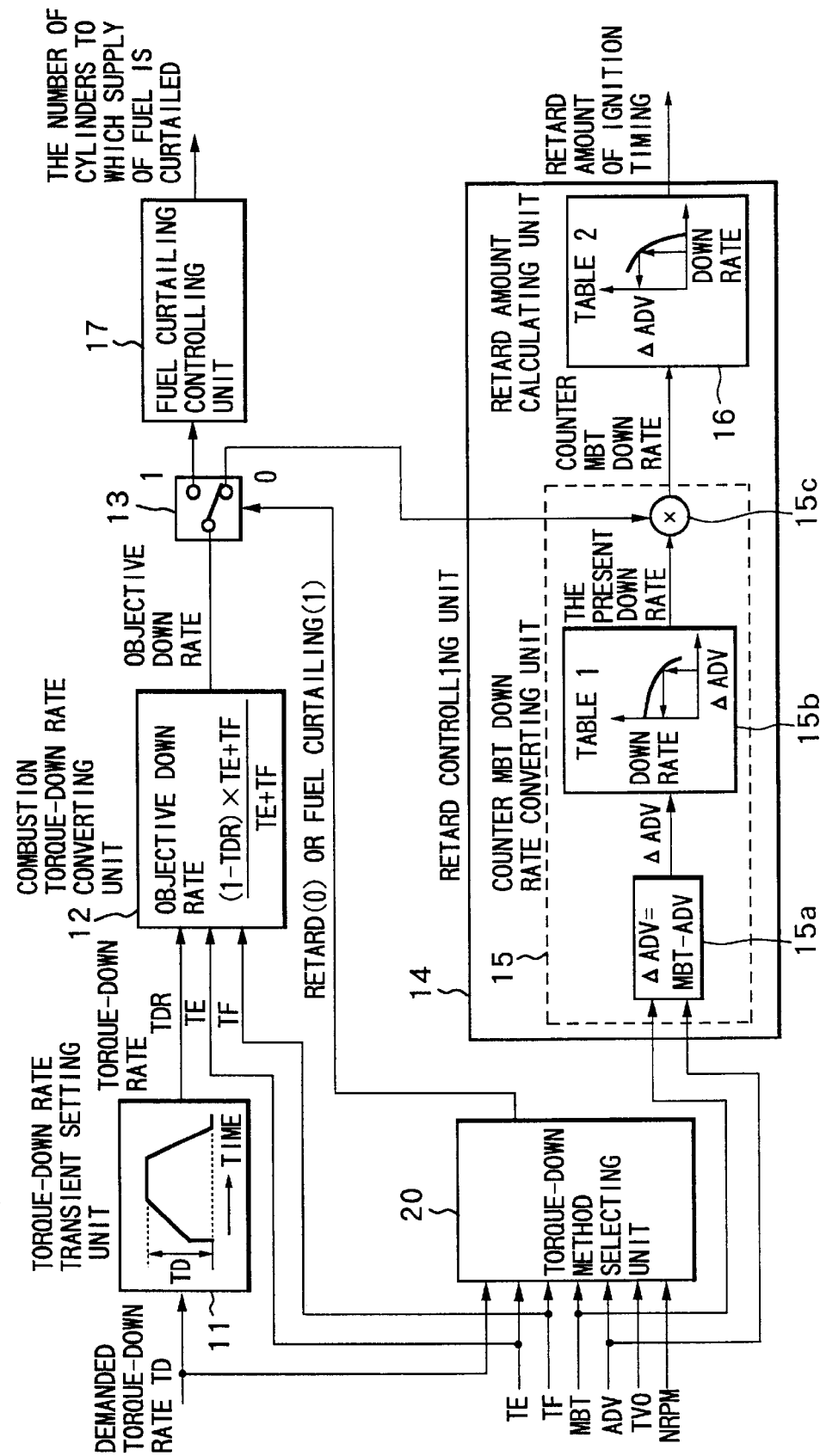
FIG. 2 is a block diagram illustrating a control system for implementing a torque-down controlling.

Referring to the block diagram of FIG. 2, which illustrates a control system provided in the engine control unit 6 for conducting the torque-down controlling upon gear changing, the predetermined demand for the torque-down rate TD issued from the transmission control unit 7 is inputted to a torque-down rate transient setting unit 11. It should here be noted that the predetermined demand for the torque-down rate TD referred to above is a numerical value indicating what part of the present value of the engine torque would like to be cut down, and therefore, for example, if 10% of the present engine torque would like to be cut down, TD equals to 0.1 (TD=0.1). In practice, TD is selected from values ranging from 0.1 to 0.6, depending on the gear changing patterns taken by the automatic transmission 2.

Upon receipt of the predetermined demand for the torque-down rate from the transmission control unit 7, the torque-down rate transient setting unit 11 determines a rate of torque-down TDR, which indicates how amount of torque-down should be made momentarily against the present engine torque on the basis of a predetermined transient characteristic and according to the demanded torque-down rate TD. The above-mentioned predetermined transient characteristic is a rate of change of the torque-down rate at every, for example, 10 ms while making a final objective value (the demanded torque-down rate TD) 1, and is set at a value selected from the range from 0.06 to 1.0, depending on a change in the gear changing pattern. Of course, the maximum value of the torque-down rate TDR determined at this stage corresponds to the demanded torque-down rate TD.

A combustion torque-down rate converting unit 12 calculates a rate of down of combustion torque, which indicates what amount of rate a combustion torque should be changed from its present torque value, in order to cut down the engine torque by the torque-down rate TDR, and the rate of down of combustion torque will be hereinafter referred to as an objective down rate that can be, for example, 0.9 when the combustion torque should be changed to 90% of the present torque value.

More specifically, since the combustion torque can be obtained as the sum of engine torque TE and friction torque TF, the objective down rate can be calculated by the equation below, on the basis of the torque-down rate TDR outputted by the torque-down rate transient setting unit 11, the engine torque TE, and the friction torque TF.

The objective down rate=$((1-TDR) \times TE+TF)/(TE+TF)$

Figure 4:
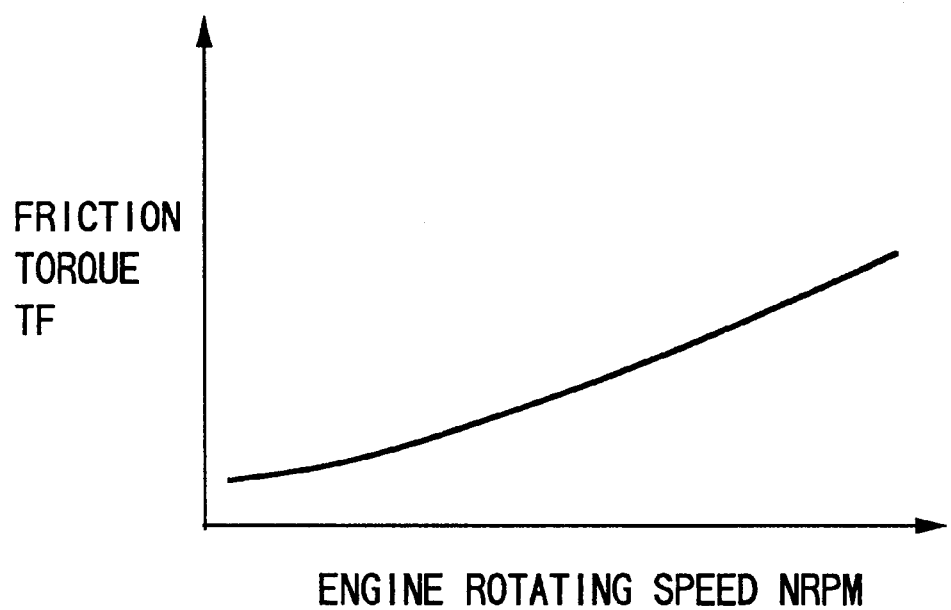
FIG. 4 is a graphical view illustrating a table for setting a friction torque.

The engine torque TE can be obtained by referring to a MAP on the basis of the data of a throttle opening degree TVO and an engine rotating speed NRPM. Further, the friction torque TF can be obtained by referring to a table of friction torque preliminarily set by making the engine rotating speed NRPM a parameter, as shown in FIG. 4.

A changeover switch 13 is provided to be changed over from one position to the other and vice versa by a later-described torque-down method selecting unit 20 (a changeover unit 26 in FIG. 3). Thus, when the torque-down method selecting unit 20 selects an ignition timing retard (0), the signal of the objective down rate is sent to a retard controlling unit 14 via the position (0) of the changer switch 13. On the other hand, when the torque-down method selecting unit 20 selects a curtailing of fuel (1), the signal of the objective down rate is sent to a fuel curtailing controlling unit 17 via the position (1) of the changeover switch 13.

The retard-controlling unit 14 is provided with a counter MBT down rate converting unit 15 and a retard-amount calculating unit 16. The counter MBT down rate converting unit 15 acts so as to convert the above-mentioned objective down rate into a counter MBT down rate that is a down rate against a combustion torque at the MBT ignition timing (it will be hereinafter referred to as merely the MBT) according to the converting processes 15a through 15c. Namely, in the first process 15a, the MBT and the present ignition timing ADV are read in, and a difference Δ between the present ignition timing ADV and the MBT is calculated by the following equation, i.e., ΔADV=MBT−ADV. At this stage, it should be understood that although the MBT can be obtained by referring to a MAP on the basis of data including an engine rotating speed NRPM, a throttle opening degree TVO and so on, it may alternatively be obtained by a calculation while taking into consideration a flame speed of the combustion and a time delay in occurrence of ignition (an ignition delay), as disclosed in Laid-open Japanese Patent Publication No. 10-318110.

In the subsequent process 15b, the table 1 is referred to, which stores data indicating a relationship between the above-mentioned difference ΔADV and a rate of the combustion torque at the timing with ΔADV against that at the MBT (i.e., the down rate of torque). It is to be noted that the relationship between the ΔADV and the down rate of torque is definitely determined irrespective of the operating condition of the engine. Therefore, by using the present ΔADV, the rate of the present combustion torque against the combustion torque at the MBT (the down rate of torque) is obtained by referring to the table 1. In the further process 15c, a counter MBT down rate is obtained by multiplying the present down rate and the objective down rate together. This is because the product of the present down rate and the objective down rate indicates a counter MBT down rate, which represents what rate of combustion torque should be selected against the combustion torque at the MBT.

In the retard amount calculating unit 16, on the basis of the counter MBT down rate obtained in the above process 15c, a table 2 is referred to for obtaining the amount of retard. It should be noted that since the ordinate and the abscissa of the table 2 are only reversed from those of the above-mentioned table 1, the characteristic curve shown in the table 2 is the same as that shown in the table 1. By referring to the table 2 using the counter MBT down rate, it is possible to obtain the amount of retard, which represents how amount the ignition timing should be changed from the MBT. Therefore, on the basis of the obtained amount of retard of ignition timing, a controlling operation for retarding the ignition timing is implemented. At this stage, as described above, the characteristic curve shown in the table 2 is the same as that shown in the table 1, it may be possible to omit the table 2 while re-using the table 1 during the referring process in the retard amount calculating unit 16.

The fuel curtailing controlling unit 17 calculates the number of cylinders to which the supply of fuel should be curtailed by comparing the objective down rate with a predetermined threshold value. The calculated number of cylinders to which the supply of fuel should be curtailed is used for cutting down the supply of fuel to a part of the engine cylinders.

The description of the operation of the torque-down method selecting unit 20 will be provided below.

Basically, the torque-down method selecting unit 20 conducts a judgment as to whether or not the amount of retard of ignition timing for the torque-down controlling reaches a predetermined value. When it is detected that the amount of retard of the ignition timing is equal to or larger than the predetermined value, the torque-down method selecting unit 20 judges that the amount of retard of the ignition timing reaches a limitative amount, and switches the controlling operation by the retard controlling unit 14 to that by the fuel curtailing controlling unit 17 via the operation of the changeover switch 13. Nevertheless, in the present embodiment, since the amount of retard of the ignition timing changes during the gear changing operation due to the fact that a certain transient characteristic is provided for the demanded torque-down rate TD, the maximum amount of retard is preliminarily calculated, and as soon as the calculated maximum amount of retard of the ignition timing is detected to be equal to or larger than a predetermined value, the switching of the controlling by the retard controlling unit 14 to that by the fuel curtailing controlling unit 17 is conducted from the beginning without making the above-mentioned judgment. At this stage, the above-mentioned predetermined value with which either the amount of retard of the ignition timing or the maximum amount of retard of the ignition timing is compared corresponds to an upper limit value of the amount of retard of the ignition timing from the viewpoint of securing the stability of combustion in the engine and of protecting parts and elements of the ignition system from breakage, and is set at, for example, 7 degrees.

As described above, the maximum value of the torque-down rate TDR during the gear changing operation is equal to a demanded torque-down rate TD, and accordingly the retard amount at this time becomes the maximum amount of retard of the ignition timing.

Therefore, by directly using the demanded torque-down rate TD instead of the torque-down rate TDR to convert it into the down rate of the combustion torque, it is possible to obtain the maximum down rate of the combustion torque. Thus, the maximum down rate of the combustion torque can be further converted to obtain a counter MBT down rate from which it is obtain the maximum amount of retard of the ignition timing from the MBT.

Figure 3:
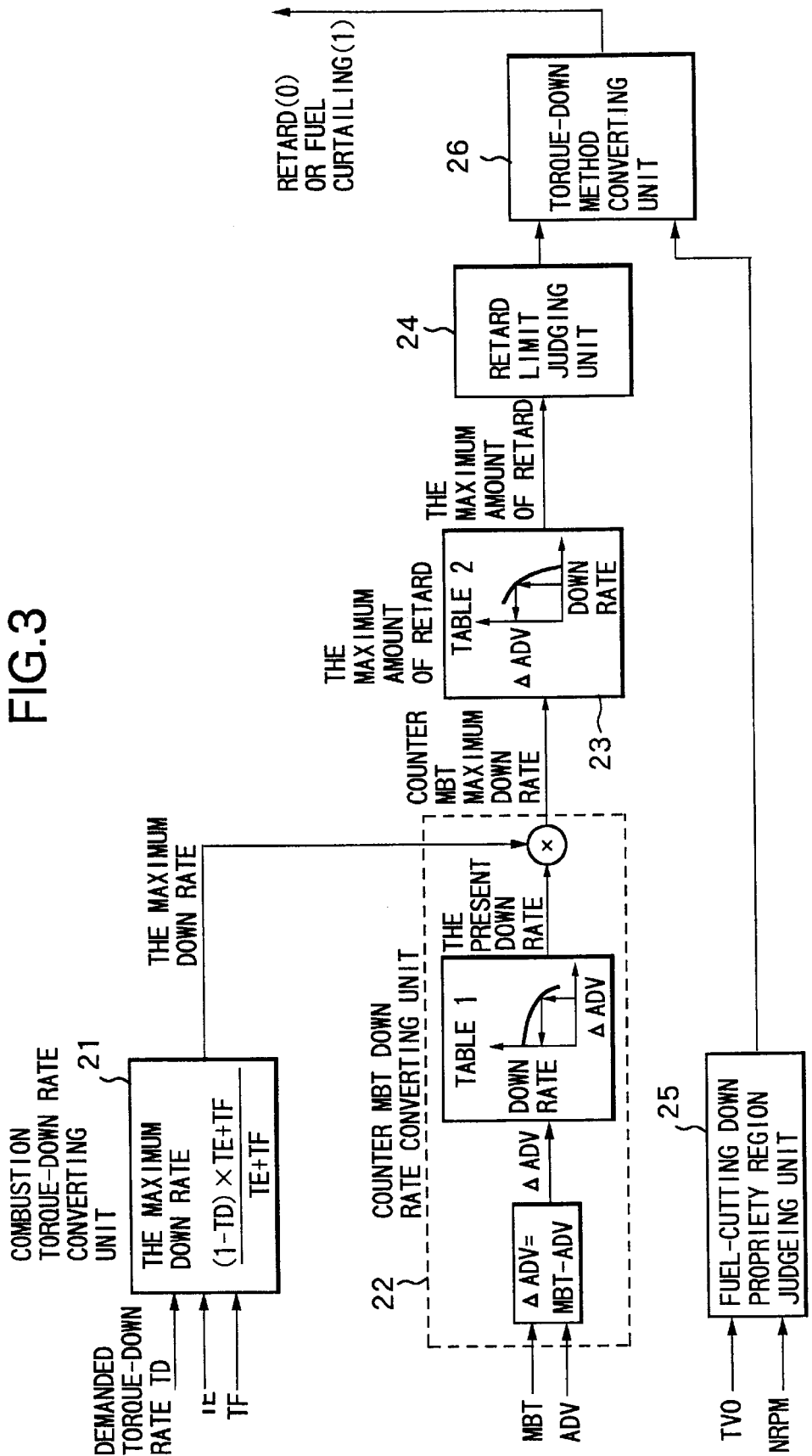
FIG. 3 is a detailed block diagram illustrating detailed construction of a selecting part of torque-down methods.

Referring to the block diagram of FIG. 3, illustrating the detailed systematic construction of the torque-down method selecting unit 20, there are provided a combustion torque-down rate converting unit 21, a counter MBT down rate converting unit 22, a maximum retard amount calculating unit 23, a retard limit judging unit 24, a fuel-cutting down propriety region judging unit 25 and a torque-down method converting unit 26.

The combustion torque-down rate converting unit 21 functions so as to obtain the maximum down rate of combustion torque when the demanded torque-down rate TD is inputted therein by using the equation below.

The maximum down rate $= ((1-TD) \times TE + TF)/(TE + TF)$

The counter MBT down rate converting unit 22 functions so as to obtain a counter MBT maximum down rate. Namely, the unit 22 firstly obtains a difference ΔADV between the MBT and the present ignition timing ADV to subsequently obtain the present down rate on the basis of the obtained difference ΔADV by referring to the table 1, and then multiplies the obtained present down rate by the maximum down rate outputted by the combustion torque-down rate converting unit 21 to obtain the counter MBT maximum down rate.

The maximum retard amount calculating unit 23 functions so as to obtain the maximum amount of retard of ignition timing from the MBT, on the basis of the above-obtained counter MBT maximum down rate by referring to the table 2.

The retard limit judging unit 24 functions so as to judge as to whether or not the above-obtained maximum amount of retard from the MBT reaches a retard limit (the maximum amount of retard 2 a predetermined value) by comparing the maximum amount of retard from the MBT with the predetermined value.

On the other hand, the fuel-cutting down propriety region judging unit 25 functions so as to judge as to whether or not the present operating condition of the engine belongs to an operation region (e.g., a region in which the throttle opening degree is small and the engine rotating speed is small) that allows the supply of fuel to be curtailed, on the basis of the data of throttle opening degree TVO and engine rotating speed NRPM which have been detected by the respective sensors and have been inputted into the fuel-cutting down propriety region judging unit 25.

The output data of the retard limit judging unit 24 and the fuel-cutting down propriety region judging unit 25 are inputted into the torque-down method converting unit 26.

Thus, the torque-down method converting unit 26 functions so as to prohibit the ignition timing from being retarded and to curtail the supply of fuel when the result of judgment of the retard limit judging unit 24 indicates that the maximum amount of retard exceeds the predetermined value (the retard limit) and additionally when the result of judgment of the fuel-cutting down propriety region judging unit 25 indicates that the curtailing of the supply of fuel may be possible. Otherwise, the torque-down method converting unit 26 functions so as to switch the changeover switch 13 (FIG. 2) to the position (0) so that the ignition timing is retarded. As a result, even when the ignition timing should be retarded as much as any further retarding is unable, it is possible to achieve the torque-down controlling of the engine by curtailing or cutting down of the supply of fuel. In addition, since it is possible to preliminarily be aware of what extent the maximum amount of retard is during gear changing of the automatic transmission, when it is presumed that the ignition timing cannot be retarded any more in the middle of the operation of gear changing, an operation to carry out the cutting down of supply of fuel to the engine can be implemented from the beginning to thereby be able to prevent occurrence of any mechanical shock due to the switching from the retarding of the ignition timing to the cutting down of supply of fuel during gear changing operation.

In the described embodiment of the present invention, each of the demanded torque-down rate TD and the rate of torque-down TDR generally means a rate of torque-down amount against a torque before the cutting down of torque is implemented. Further, each of the objective down rate, the present down rate, the counter MBT down rate, the maximum down rate, and the counter MBT maximum down rate means a rate of a torque after the cutting down of the torque is implemented against a torque before the cutting down of the torque is implemented. Nevertheless, with respect to the latter case, it may be calculated such that each of the above five down rate means a rate of torque-down amount against a torque before cutting down of the torque is implemented. It should be noted the even in such case, the relationship between the retard amount from the MBT and the down rate can be definitely and unequivocally determined.

From the foregoing, it will be understood that according to the present invention, a demanded rate of torque-down against the present engine torque is converted into a down rate of a combustion torque, which is subsequently converted into a counter MBT down rate that is a down rate against the combustion torque at the MBT ignition timing, and from the converted counter MBT down rate, a retard amount of ignition timing from the MBT ignition timing is calculated. Therefore, when the calculation of the retard amount of ignition timing is carried out for achieving the torque-down controlling, it is able to obtain the retard amount of ignition timing from the MBT ignition timing by using a simple table, which uses only the counter MBT down rate as a parameter.

Further, in order to obtain the counter MBT down rate, a calculation to obtain a rate of the present combustion torque against the combustion torque at the MBT ignition timing (the present down rate) is conducted. At this stage, the above calculation can be accomplished by using a further simple table, which uses only the difference between the MBT ignition timing and the present ignition timing as a parameter. Accordingly, the calculation to obtain the counter MBT down rate can be very simple.

The entire description of Japanese Patent Application No. 2000-387848 filed on Dec. 20, 2000, the convention priority of which is claimed, is incorporated herein by reference:

While only selected embodiments have been chosen to illustrate the present invention, it will be apparent to a person skilled in the art from this disclosure that various changes and modifications will occur herein without departing from the scope of the invention as defined in the accompanied claims. Furthermore, the foregoing description of the embodiments according to the present invention are provided for illustration only, and not for the purpose of limiting the invention as defined by the accompanied claims and their equivalents.

What is claim is:

1. A control apparatus provided to have a control communication with an internal combustion engine and an automatic transmission, and including a torque-down control unit for implementing a torque-down controlling of the internal combustion engine upon gear changing of the automatic transmission by cutting down a part of the present engine torque at a predetermined demand for a torque-down rate, wherein the torque-down control unit:

converts the predetermined demand for a torque-down rate into a down rate of combustion torque as a sum of engine torque and friction torque;

converts the down rate of combustion torque into a counter MBT down rate that is a down rate against a combustion torque at an ignition timing for a Minimum Advance for Best Torque (MBT ignition timing); and calculates an amount of retard of ignition timing from the MBT ignition timing on the basis of the counter MBT down rate, for implementing the torque-down controlling of the engine.

2. The control apparatus as claimed in claim 1, wherein the converting operation of the down rate of combustion torque into the counter MBT down rate comprises:

obtaining a rate of the present combustion torque and the combustion torque at the MBT ignition timing, on the basis of a difference between the present ignition timing and the MBT ignition timing; and multiplying the obtained rate by the first-mentioned down rate of combustion torque to thereby obtain the aforementioned counter MBT down rate.

3. An apparatus for controlling a torque-down of the present engine torque of an internal combustion engine upon gear changing of an automatic transmission at a predetermined demand for a rate of torque-down, comprising:

a combustion torque down rate converting means for converting the predetermined demand for a torque-down rate into a down rate of combustion torque as a sum of engine torque and friction torque;

a counter MBT down rate converting means for converting the down rate of combustion torque into a counter MBT down rate that is a down rate against a combustion torque at an ignition timing for a Minimum Advance for Best Torque (MBT ignition timing); and an ignition timing retard amount calculating means for calculating an amount of retard of ignition timing from the MBT ignition timing on the basis of the counter MBT down rate, for implementing the torque-down controlling of the engine.

4. A control apparatus provided to have a control communication with an internal combustion engine and an automatic transmission, and including a torque-down control unit for implementing a torque-down controlling of the internal combustion engine upon gear changing of the automatic transmission by cutting down a part of the present engine torque at a predetermined demand for a torque-down rate, wherein the torque-down control unit:

converts the predetermined demand for a torque-down rate into a down rate of combustion torque;

converts the down rate of combustion torque into a counter MBT down rate that is a down rate against a combustion torque at an ignition timing for a Minimum Advance for Best Torque (MBT ignition timing);

calculates an amount of retard of ignition timing from the MBT ignition timing on the basis of the counter MBT down rate, for implementing the torque-down controlling of the engine;

compares the above-calculated amount of retard of ignition timing from the MBT ignition timing with a predetermined value; and prohibits the ignition timing from being retarded while curtailing the supply of fuel when the above comparison indicates that the calculated amount of retard of ignition timing exceeds the predetermined value, for implementing the torque-down controlling of the engine.

5. The control apparatus as claimed in claim 4, wherein the torque-down control unit further:

preliminarily calculates the maximum amount of retard of ignition timing that is an amount of retard of ignition timing from the MBT ignition timing necessary for accomplishing the maximum down rate of the demanded rate of torque down, on the basis of the above-mentioned maximum down rate in the case where the demand for the rate of torque-down is changed with a predetermined transient characteristic during the gear changing;

compares the maximum amount of retard of ignition timing with the afore-mentioned predetermined value; and prohibits the ignition timing from being retarded while curtailing the supply of fuel when the above comparison indicates that the calculated maximum amount of retard of ignition timing exceeds the predetermined value, for implementing the torque-down controlling of the engine.

6. A method of controlling a torque-down of the present engine torque of an internal combustion engine upon gear changing of an automatic transmission at a predetermined demand for a rate of torque-down, comprising:

converting the predetermined demand for a torque-down rate into a down rate of combustion torque as a sum of engine torque and friction torque;

converting the down rate of combustion torque into a counter MBT down rate that is a down rate against a combustion torque at an ignition timing for a Minimum Advance for Best Torque (MBT ignition timing); and calculating an amount of retard of ignition timing from the MBT ignition timing on the basis of the counter MBT down rate, for implementing the torque-down controlling of the engine.

\* \* \* \* \*